United States Patent
Holmes et al.

(10) Patent No.: US 6,527,658 B2
(45) Date of Patent: Mar. 4, 2003

(54) ELECTRICALLY VARIABLE TRANSMISSION WITH SELECTIVE INPUT SPLIT, COMPOUND SPLIT, NEUTRAL AND REVERSE MODES

(75) Inventors: Alan G Holmes, Fishers, IN (US); Donald Klemen, Carmel, IN (US); Michael Roland Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 17 days.

(21) Appl. No.: 09/823,224

(22) Filed: Apr. 2, 2001

(65) Prior Publication Data

US 2002/0142876 A1 Oct. 3, 2002

(51) Int. Cl.$^7$ ................................................. B60K 6/00
(52) U.S. Cl. ............................ 475/5; 475/317; 475/319
(58) Field of Search ............................ 475/5, 317, 319

(56) References Cited

U.S. PATENT DOCUMENTS

| | | | | |
|---|---|---|---|---|
| 740,128 A | * | 9/1903 | Harvey | 475/319 |
| 5,558,588 A | * | 9/1996 | Schmidt | 475/5 |
| 5,558,589 A | * | 9/1996 | Schmidt | 475/5 |
| 5,571,058 A | * | 11/1996 | Schmidt | 475/5 |
| 5,577,973 A | * | 11/1996 | Schmidt | 475/5 |
| 5,669,842 A | * | 9/1997 | Schmidt | 475/5 |
| 5,931,757 A | * | 8/1999 | Schmidt | 475/2 |
| 5,935,035 A | * | 8/1999 | Schmidt | 475/5 |
| 6,090,005 A | * | 7/2000 | Schmidt et al. | 475/5 |
| 6,234,930 B1 | * | 5/2001 | Kaneko | 475/5 |

* cited by examiner

Primary Examiner—Rodney H. Bonck
Assistant Examiner—Eric M. Williams
(74) Attorney, Agent, or Firm—Leslie C. Hodges

(57) ABSTRACT

Electrically variable transmissions embodying the concepts the present invention utilize two planetary gear subsets, two motor/generators and two clutches in the nature of torque transfer devices to effect input split, compound split, neutral and reverse modes of operation. Both planetary gear subsets may be simple, or one may be individually compounded. An electrical control member regulates power flow among an energy storage device and the two motor/generators. In either of two preferred embodiments the neutral mode of operation may be effected by releasing the two torque transfer devices, and the reverse mode of operation may be effected by reversing the magnetic polarity of one motor/generator. In addition, the two preferred embodiments allow a geared neutral as well as reverse to be effected by means of the differential gearing arrangement of the planetary gear subsets and other members of the transmission.

16 Claims, 4 Drawing Sheets

ELECTRICALLY VARIABLE TRANSMISSION WITH SELECTIVE INPUT SPLIT, COMPOUND SPLIT, NEUTRAL AND REVERSE MODES

TECHNICAL FIELD

The present invention relates generally to vehicular transmissions. More particularly, the present invention relates to electrically variable transmissions with selective operation that can be tailored to the specific use, or uses, to which the vehicle in which the transmission is incorporated is intended to be used. Specifically, the present invention relates to a transmission having only two differential gearing components, typically planetary gear subsets, and two clutches in the nature of torque transfer devices and yet may be selectively operated in an input split mode, a compound split mode, a neutral mode or a reverse mode.

BACKGROUND OF THE INVENTION

Air quality, the possibility of climate change, and dependency on fossil fuels are great public concerns today. Vehicles now produce roughly a third of air pollutants and consume roughly a third of fossil fuels. A novel transmission system, for use primarily in vehicles, which can help to reduce emissions and fuel consumption may be of great benefit to the public.

Internal combustion engines, particularly those of the reciprocating piston type, currently propel most vehicles. These engines are soundly criticized by public figures and groups as the most flagrant source of air pollution, energy consumption, and climate change. However, internal combustion engines are relatively efficient, compact, lightweight, and inexpensive mechanisms by which to convert fossil fuel into useful mechanical power, so that with the exception of their negative environmental impact they are very suitable for vehicle propulsion. One of the primary reasons that internal combustion engines are a major source of pollution and fuel consumption is their success and widespread use.

The flexibility with which reciprocating piston internal combustion engines operate is another reason for their pollution and energy consumption. Typically, a vehicle is propelled by such an engine, which is started from a cold state by a small electric motor and relatively small electric storage batteries, then quickly placed under the load of effecting propulsion and operating accessory equipment. Such an engine is also operated through a wide range of speeds and a wide range of loads and typically at a fifth of its maximum power. These wide ranges of engine operation require that clean, efficient combustion be maintained through extremes in operating conditions—an elusive goal.

A vehicle transmission can deliver mechanical power from an engine to the remainder of a drive system, typically fixed gearing, axles, and wheels. A transmission allows some freedom in engine operation, usually through alternate selection of five or six different drive ratios, a neutral selection that allows the engine to operate accessories with the vehicle stationary, and clutches or torque converters that allow smooth transitions between driving ratios to start the vehicle from rest and accelerate to the desired highway speed with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate relatively independently of the torque, speed, and power to propel a vehicle, so as to be controlled for improved emissions and efficiency. This system also allows the electric machine attached to the engine to function as a motor to start the engine and allows the electric machine attached to the remainder of the drive train to act as a generator, recovering energy into the battery by regenerative braking. A series electric drive suffers from the weight of the electric machinery necessary to transform all engine power from mechanical to electrical and from electrical to mechanical, and from the useful power lost in this double conversion.

A power split transmission can use what is commonly understood to be a "differential gearing" to achieve a continuously variable torque and speed ratio between input and output without sending all power through the variable elements. An electrically variable transmission can use differential gearing to send a fraction of its transmitted power through a pair of electric motor/generators and the remainder of its power through another, parallel path that is all mechanical and direct, of fixed ratio, or alternatively selectable. One form of differential gearing, as is well known to those skilled in this art, may constitute a planetary gear subset. In fact, planetary gearing is usually the preferred embodiment employed in differentially geared inventions, with the advantage of compactness and different torque and speed ratios among all members of the planetary gearing subset. However, it is possible to construct this invention without planetary gears, as by using bevel differential gears or other differential gears.

For example, a set of bevel differential gears found in a typical automobile axle consists of three or four bevel pinions on a carrier and a meshing bevel gear for each axle. To replace the first subset of planetary gearing in the first embodiment of the invention, the carrier of a first set of bevel differential gears would be connected to the input, one bevel gear that would normally be connected to an axle would instead be connected to the first motor, and the other such bevel gear would be connected to the central shaft. Bevel differential gears could likewise replace the second subset of planetary gearing, and so the invention could be embodied without any planetary gears.

A hybrid electrically variable transmission system for a vehicle also includes an electric storage battery, which allows the mechanical output power to vary from the mechanical input power, engine starting with the transmission system and regenerative vehicle braking.

An electrically variable transmission in a vehicle can simply transmit mechanical power. To do so, the electric power produced by one motor/generator balances the electrical losses and the electric power consumed by the other motor/generator. A hybrid electrically variable transmission system in a vehicle includes an electrical storage battery, so the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

One of the most successful substitutes for the series hybrid transmission is the variable, two-mode, input-split, parallel, hybrid electric transmission. Such a transmission utilizes an input means to receive power from the vehicle engine and a power output means to deliver power to drive the vehicle. First and second motor/generators are connected to energy storage devices, such as batteries, so that the energy storage devices can accept power from, and supply power to, the first and second motor/generators. A control unit regulates power flow among the energy storage devices and the motor/generators as well as between the first and second motor/generators.

Operation in a first or second mode may be selectively achieved by using clutches in the nature of torque transfer devices. In one mode the output speed of the transmission is proportional to the speed of one motor/generator, and in the second mode the output speed of the transmission is generally proportional to the speed of the other motor/generator.

In some embodiments of the variable, two-mode, input-split, parallel, hybrid electric transmission a second planetary gear set is employed. In addition, some embodiments may utilize three torque transfer devices—two to select the operational mode desired of the transmission and the third selectively to disconnect the transmission from the engine. In other embodiments, all three torque transfers may be utilized to select the desired operational mode of the transmission.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

Accordingly, there is a need in the art for a large horsepower transmission system which provides maximum power with little additional power provided by the electric storage device. It is also desirable to enhance overall efficiency at high output speeds. These objectives can be achieved by a two-mode, compound-split, electromechanical transmission that provides the desired high efficiency sought for continuous, constant-speed operation as well as high-average power applications.

SUMMARY OF THE INVENTION

It is, therefore, one primary aspect of the present invention to provide a new and novel electrically variable transmission that requires only two torque transfer devices to select either an input split mode of operation or a compound split mode of operation.

It is another aspect of the present invention provide a new and novel electrically variable transmission, as above, that provides the functionality of prior known electrically variable transmissions incorporating three planetary gear subsets and with considerably less complexity.

It is a further aspect of the present invention to provide a new and novel electrically variable transmission, as above, that requires only two planetary gear subsets to provide advantageous torque multiplication from an engine input and two motor/generators that was available only in previously known electrically variable transmissions employing at least three planetary gear subsets.

It is a still further aspect of the present invention to provide a new and novel electrically variable transmission, as above, that provides a neutral mode as well as a reverse mode of operation without the need to employ a third torque transfer device.

It is yet another aspect of the present invention to provide a new and novel electrically variable transmission, as above, that is significantly less complex than prior known electrically variable transmissions.

It is an even further aspect of the present invention to provide a new and novel electrically variable transmission, as above, that can be manufactured at a significant cost reduction relative to prior known electrically variable transmissions.

These and other aspects of the invention, as well as the advantages thereof over existing and prior art forms, which will be apparent in view of the following detailed specification, are accomplished by means hereinafter described and claimed.

By way of a general introductory description, an electrically variable transmission embodying the concepts of the present invention has an input member to receive power from an engine and an output member to deliver power to the drive members that propel the vehicle. There are first and second motor/generators as well as first and second planetary gear subsets. Each planetary gear subset has an inner gear member and an outer gear member that meshingly engage a plurality of planet gear members rotatably mounted on a carrier. The input member is operatively connected to one member of the first planetary gear subset, and the output member is operatively connected to one member of the second planetary gear subset. One motor/generator is operatively connected to another member in the first planetary gear subset as well as being selectively connected to a member of the second planetary gear subset. The second motor/generator is continuously connected to the remaining member of the first and second planetary gear subsets.

In both preferred embodiments, a first torque transfer device selectively grounds one member of the second planetary gear subset, and a second torque transfer device selectively connects this same member of the second planetary gear subset to the inner gear member of the first planetary gear subset as well as to the rotor of one motor/generator.

DESCRIPTION OF THE PREFERRED EMBODIMENT

Figure 1:
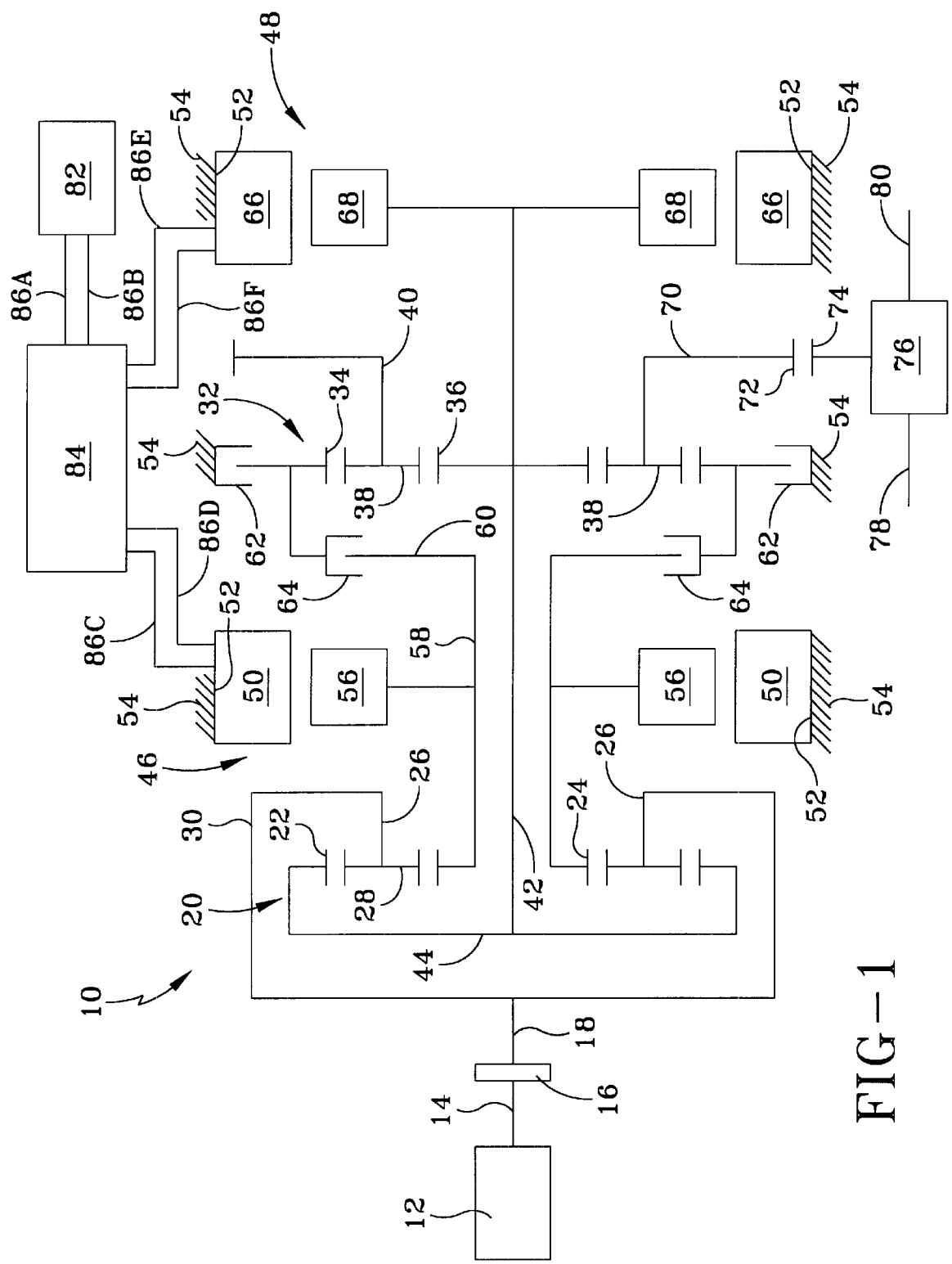
FIG. 1 is a schematic representation of one preferred form of an electrically variable transmission embodying the concepts of the present invention.

With particular reference, initially, to FIG. 1, one preferred embodiment of the improved electrically variable transmission is designated generally by the numeral 10. Transmission 10 is designed to receive at least a portion of its driving power from an engine 12. As shown, the engine 12 has an output shaft 14 that may also serve as the forward input member of a transient torque damper 16. Transient torque dampers are well known in this art, but irrespective of the particular transient torque damper 16 employed, the output member thereof serves as the input member 18 of the transmission 10, as will be hereinafter more fully described.

In the embodiment depicted the engine 12 may be a fossil fuel engine, such as a diesel engine which is readily adapted to provide its available power output typically delivered at a constant number of revolutions per minute (RPM).

Irrespective of the means by which the engine 12 is connected to the transmission input member 18, the transmission input member 18 is operatively connected to a planetary gear subset 20 in the transmission 10.

The new and novel transmission 10 utilizes two differential gear sets, preferably in the nature of planetary gear subsets. The first planetary gear subset 20 employs an outer gear member 22, typically designated as the ring gear. The ring gear 22 circumscribes an inner gear member 24, typically designated as the sun gear. A carrier 26 rotatably supports a plurality of planet gears 28 such that each planet gear 28 simultaneously, and meshingly, engages both the outer, ring gear member 22 and the inner, sun gear member 24 of the first planetary gear subset 20. The input member 18 presents a bell portion 30 that is secured to the carrier 26 of the first planetary gear subset 20.

The second planetary gear subset 32 also has an outer gear member 34, often also designated as the ring gear, that circumscribes an inner gear member 36, also often designated as the sun gear. As in the first planetary gear subset 20, a plurality of planet gears 38 are also rotatably mounted in a carrier 40 such that each planet gear member 38 simultaneously, and meshingly, engages both the outer, ring gear member 34 and the inner, sun gear member 36 of the second planetary gear subset 32.

Whereas both planetary gear subsets 20 and 32, respectively, are "simple" planetary gear subsets in their own right, the first and second planetary gear subsets 20 and 32 are compounded in that the inner, sun gear 36 of the second planetary gear subset 32 is conjoined, as through a central shaft 42, to the outer, or ring, gear 22 of the first planetary gear subset 20. Specifically, the forward end of the central shaft 42 terminates in a radially extending bell portion 44 that is secured to the outer, ring gear 22 of the first planetary gear subset 20.

The first preferred embodiment 10 also incorporates first and second motor/generators 46 and 48, respectively. The stator 50 of the first motor/generator 46 is secured to the generally annular, interior surface 52 of the transmission housing 54. The rotor 56 of the first motor/generator 46 is secured to a sleeve shaft 58. The inner, sun gear 24 of the first planetary gear subset 20 secured to the forward end of the sleeve shaft 58, and the opposite end of the sleeve shaft 58 terminates in a radially extending flange plate 60 which, as will be hereinafter described in detail constitutes an interface with a clutch means, also hereinafter described.

The ring gear 34 of the second planetary gear subset 32 is selectively rounded to the housing 54, as by a first clutch means in the nature of a torque transfer device 62. That is, the grounded ring gear 34 is selectively secured against rotation by an operative connection to the non-rotatable housing 54. The ring gear 34 of the second planetary gear subset 32 is also selectively connected to the radially extending flange plate 60, as by a second clutch means in the nature of a torque transfer device 64. The first and second torque transfer devices 62 and 64 are employed to assist in the selection of the operational modes of the hybrid transmission 10, as will be hereinafter more fully explained.

The stator 66 of the second motor/generator 48 is also secured to the generally annular, interior surface 52 of the transmission housing 54. The rotor 68 of the second motor/generator 48 is secured to the central shaft 42, and as such the first and second planetary gear subsets 20 and 32 are further compounded.

The two planetary gear subsets 20 and 32 as well as the two motor/generators 46 and 48 may be coaxially oriented, as about the axially disposed central shaft 42. This configuration assures that the overall envelope—i.e.: the circumferential dimension—of the transmission 10 may be minimized.

The available power output and RPM of the engine 12, as well as the details of the horsepower output of the first and second motor/generators 46 and 48 are not critical to the invention, but a typical result is graphically depicted on FIG. 2 and described in the hereinafter presented description of the operation of the first described of the preferred examples of transmissions embodying the concepts of the present invention.

The output drive member 70 of the transmission 10 is secured to the carrier 40 of the second planetary gear subset 32. As depicted in FIG. 1, the output drive member 70 may present peripheral gear teeth 72 meshingly to engage a gear 74 presented from a transfer case 76 that may function as a differential to present either, or both, drive shafts 78 and 80. Typically, drive shaft 78 would be employed to effect front wheel drive, and drive shaft 80 would be employed to effect rear wheel drive. It should also be appreciated that the output drive member 70 could well transfer output power to the transfer case by a chain drive or other, similar mechanical connection. Furthermore, the member 76 may be, as an alternative, a differential or other final drive, and drive shafts 78 and 80 may be axle shafts to drive the front or rear wheels directly.

Returning now to the description of the power sources, it should be apparent from the foregoing description, and with particular reference to FIG. 1, that the transmission 10 selectively receives power from the engine 12. As will now be explained, the hybrid transmission also receives power from an electric power source 82. The electric power source 82 may be one or more batteries. Other electric power sources, such as fuel cells, that have the ability to provide, or store, and dispense electric power may be used in place of batteries without altering the concepts of the present invention. As was explained in conjunction with the description of the engine 12 and the motor/generators 46 and 48, it must be similarly understood that the horsepower output of the electrical power source 78 is also not critical to the invention.

The electric power source 82 communicates with an electrical control unit (ECU) 84 by electrical transfer conductors 86A and 86B. The ECU 84 communicates with the first motor/generator 46 by electrical transfer conductors 86C and 86D, and the ECU 84 similarly communicates with the second motor/generator 48 by electrical transfer conductors 86E and 86F.

As apparent from the previous paragraph, a particular structural member, component or arrangement may be employed at more than one location. When referring generally to that type of structural member, component or arrangement, a common numerical designation is employed. However, when one of the structural members, components or arrangements so identified is to be individually identified, it will be referenced by virtue of a letter suffix employed in combination with the numerical designation employed for general identification of that structural member, component or arrangement. Thus, there are six electrical transfer conductors that are generally identified by the numeral 86, but the specific, individual, electrical transfer conductors are, therefore, identified as 86A, 86B, 86C, 86D, 86E and 86F in the specification and on the drawings. This same suffix convention shall be employed throughout the specification.

General Operating Considerations

One of the primary control devices is a well known drive range selector (not shown) that directs a conventional electronic control unit (the ECU 84) to configure the transmission for either the park, reverse, neutral, or forward drive range. The second and third primary control devices constitute an accelerator pedal (not shown) and a brake pedal (also not shown). The information obtained by the ECU from these three primary control sources is designated as the "operator demand." The ECU also obtains information from a plurality of sensors (input as well as output) as to the status of: the torque transfer devices (either applied or released); the engine output torque; the unified battery, or batteries, capacity level; and, the temperatures of selected vehicular components. The ECU determines what is required and then manipulates the selectively operated components of, or associated with, the transmission appropriately to respond to the operator demand.

Because one preferred form of the present invention typically utilizes two "simple" planetary gear sets and another preferred form utilizes a variation of the simple planetary gear set in the nature of a compound planetary gear set, it is important to remember that in a simple planetary gear subset a single set of planet gears are normally supported for rotation on a carrier that is itself rotatable.

When the sun gear is held stationary and power is applied to the ring gear of a simple planetary gear subset, the planet gears rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be accurately determined by knowing the number of teeth present on all the gear members of the planetary gear set.

Whenever the carrier is restrained from spinning freely, and power is applied to either the sun gear or the ring gear, the planet gear members act as idlers. In that way the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

In a simple set of planetary gears, if any two rotational speeds of the sun gear, the planet carrier, and the ring gear are known, then the speed of the third member can be determined using a simple rule. The rotational speed of the carrier is always proportional to the speeds of the sun and the ring, weighted by their respective numbers of teeth. For example, a ring gear may have twice as many teeth as the sun gear in the same set. The speed of the carrier is then the sum of two-thirds the speed of the ring gear and one-third the speed of the sun gear. If one of these three members rotates in an opposite direction, the arithmetic sign is negative for the speed of that member in mathematical calculations.

The torque on the sun gear, the carrier, and the ring gear can also be simply related to one another if this is done without consideration of the masses of the gears, the acceleration of the gears, or friction within the gear set, all of which have a relatively minor influence in a well designed transmission. The torque applied to the sun gear of a simple planetary gear set must balance the torque applied to the ring gear, in proportion to the number of teeth on each of these gears. For example, the torque applied to a ring gear with twice as many teeth as the sun gear in that set must be twice that applied to the sun gear, and must be applied in the same direction. The torque applied to the carrier must be equal in magnitude and opposite in direction to the sum of the torque on the sun gear and the torque on the ring gear.

Another preferred form of the present invention utilizes a compound planetary gear subset. It must be appreciated that although considerably different in structure, the two preferred embodiments are identical in operation. Hence, the same operational improvements are achieved by both preferred embodiments and yet the second preferred embodiment allows the input shaft and the output shaft to lie along the same axis of rotation. As such, offset gearing, or a chain drive, is not necessary for the output, as in the first embodiment. Forward, neutral, reverse and geared neutral may be achieved in exactly the same manner for both embodiments. As will become apparent from the detailed description that follows, the utilization of inner and outer sets of planet gears in the second preferred embodiment effects an exchange in the roles of the ring gear and the planet carrier. For instance, if the sun gear is held stationary, the planet carrier will rotate in the same direction as the ring gear, but the planet carrier with inner and outer sets of planet gears will travel faster than the ring gear, rather than slower.

In a compound planetary gear subset having meshing inner and outer sets of planet gears the speed of the ring gear is proportional to the speeds of the sun gear and the planet carrier, weighted by the number of teeth on the sun gear and the number of teeth filled by the planet gears, respectively. For example, the difference between the ring and the sun filled by the planet gears might be twice as many teeth as are on the sun gear in the same set. In that situation the speed of the ring gear would be the sum of two-thirds the speed of the carrier and one third the speed of the sun. If the sun gear or the planet carrier rotates in an opposite direction, the arithmetic sign is negative for that speed in mathematical calculations.

If the sun gear were to be held stationary, then a carrier with inner and outer sets of planet gears will turn in the same direction as the rotating ring gear of that subset. On the other hand, if the sun gear were to be held stationary and the carrier were to be driven, then planet gears in the inner set that engage the sun gear roll, or "walk," along the sun gear, turning in the same direction that the carrier is rotating. Pinion gears in the outer set that mesh with pinion gears in the inner set will turn in the opposite direction, thus forcing a meshing ring gear in the opposite direction, but only with respect to the planet gears with which the ring gear is meshingly engaged. The planet gears in the outer set are being carried along in the direction of the carrier. The effect of the rotation of the pinion gears in the outer set on their own axis and the greater effect of the orbital motion of the planet gears in the outer set due to the motion of the carrier are combined, so the ring rotates in the same direction as the carrier, but not as fast as the carrier.

If the carrier in such a compound planetary gear subset were to be held stationary and the sun gear were to be rotated, then the ring gear will rotate with less speed and in the same direction as the sun gear. If the ring gear of a simple planetary gear subset is held stationary and the sun gear is rotated, then the carrier supporting a single set of planet gears will rotate with less speed and in the same direction as the sun gear. Thus, one can readily observe the exchange in roles between the carrier and the ring gear that is caused by the use of inner and outer sets of planet gears which mesh with one another, in comparison with the usage of a single set of planet gears in a simple planetary gear subset.

The normal action of a electrically variable transmission is to transmit mechanical power from the input to the output. As part of this transmission action, one of its two motor/generators acts as a generator of electrical power. The other motor/generator acts as a motor and uses that electrical power. As the speed of the output increases from zero to a high speed, the two motor/generators gradually exchange roles as generator and motor, and may do so more than once. These exchanges take place around mechanical points, where essentially all of the power from input to output is transmitted mechanically and no substantial power is transmitted electrically.

In a hybrid electrically variable transmission system, an electric storage battery may also supply power to the transmission or the transmission may supply power to the battery. If the battery is supplying substantial electric power to the transmission, such as for vehicle acceleration, then both motor/generators may act as motors. If the transmission is supplying electric power to the battery, such as for regenerative braking, both motor/generators may act as generators. Very near the mechanical points of operation, both motor/generators may also act as generators with small electrical power outputs, because of the electrical losses in the system.

Contrary to the normal action of the transmission, the transmission may actually be used to transmit mechanical power from the output to the input. This may be done in a vehicle to supplement the vehicle brakes and to enhance or to supplement regenerative braking of the vehicle, especially on long downward grades. If the power flow through the transmission is reversed in this way, the roles of the motor/generators will then be reversed from those in normal action.

Operation of the First described Embodiment
In the Input Split Mode

To effect the input split mode of operation for transmission 10 the torque transfer device 62 in engaged to ground the outer, ring gear 34 of the second planetary gear subset 32. As such, the transmission 10 uses the carrier 26 of the first planetary gear subset 20 to receive power provided by the engine 12 and ring gear 22 of that same planetary gear subset to provide power to the central shaft 42 by motor/generator 48 operating as a motor. Simultaneously, the transmission 10 uses the second planetary gear subset 32 to multiply the torque received through the sun gear 36 of the second planetary gear subset 32 and applied to the carrier 40 against the reaction imposed by the grounded ring gear 34 to be delivered to output drive member 70. In this mode the engine 12 may maintain a constant speed, as represented by plotted line 88 on the example of operating speeds depicted in FIG. 2. The ECU 84 directs the first motor/generator 46 to operate as a generator beginning with relatively high rotational speed at zero input speed and gradually diminishing its rotational speed, as indicated by plotted line 90, to a mechanical point 92A. Similarly, the motor/generator 48 transitions from its operation as a motor, as plotted by line 94, to operation as a generator, as plotted by line 100. Incidentally, a second mechanical point 92B is designated at the point where the speed line 100 of motor/generator 46 crosses the abscissa in FIG. 2. As is well known to the art, the maximum mechanical efficiency in the transfer of power from the power input to the output occurs when one of the motor/generators is at a mechanical point—i.e.: stationary.

In The Compound Split Mode

When the motor/generator 46 stops rotating, as represented by the plotted mechanical point 92A, the second torque transfer device 64 is engaged and the first torque transfer device 62 is disengaged to effect a synchronous shift from the first to the second mode of operation.

In the compound split mode the transmission uses the same two planetary gear subsets 20 and 32 to provide gearing among the input member 18, both motor/generators 46 and 48 and the output drive member 70.

Figure 2:
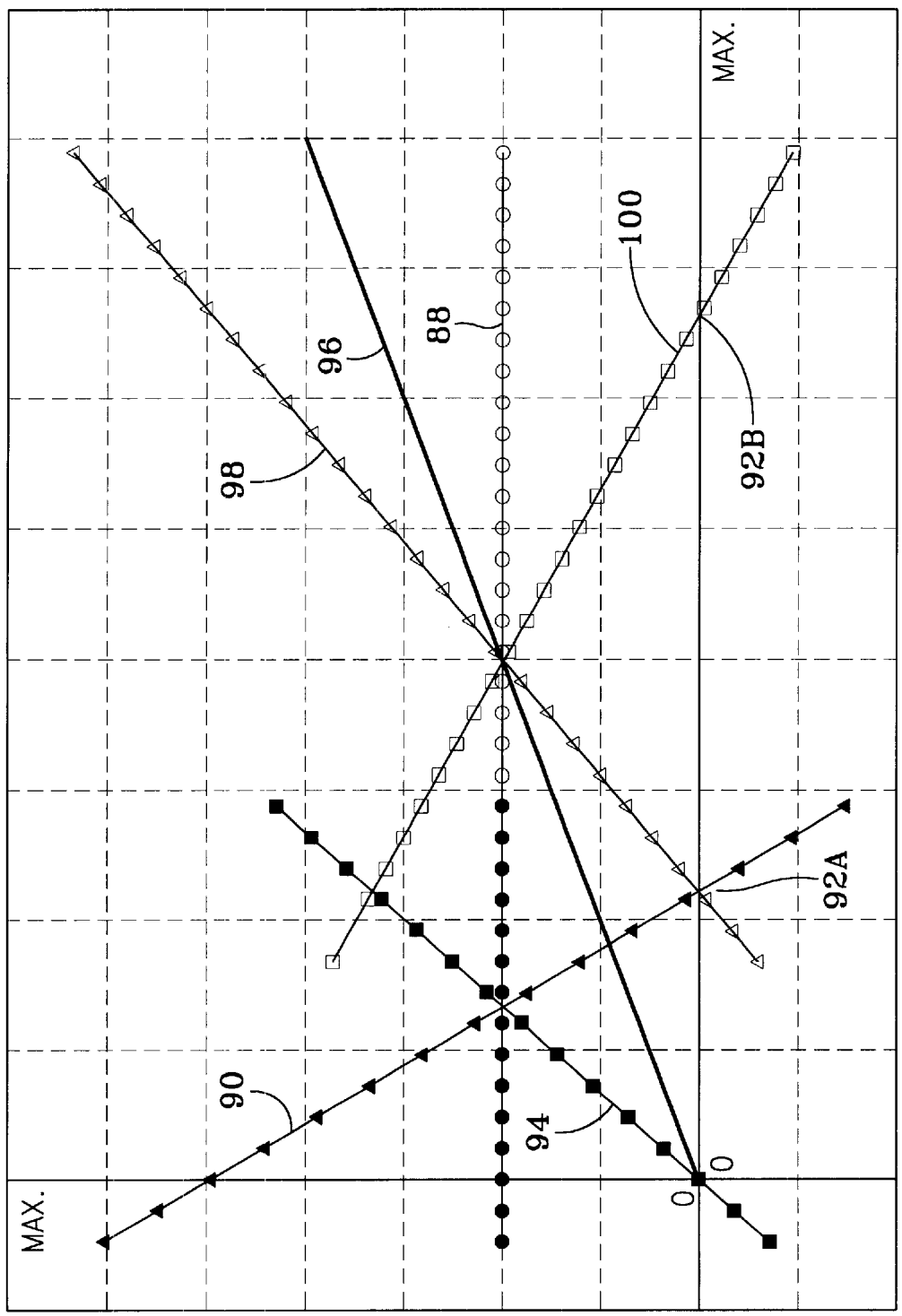
FIG. 2 is a graphical representation of th speeds of the first and second motor/generators relative to the engine speed and the vehicle speed through the two driving modes in which the first preferred form of the electrically variable transmission operates.

In this mode the engine 12 may, for example, maintain a constant speed, as also represented by plotted line 88 on FIG. 2. The ECU 84 directs the first motor/generator 46 to operate as a motor beginning with virtually zero rotation at a moderate output speed and moderate vehicle speed and gradually increasing its rotational speed, as indicated by plotted line 98. The second motor/generator 48 will then operate as a generator with positive rotational direction as indicated by the positive segment of plotted line 100.

The rotational speed of the second motor/generator 48 is reversed at the mechanical point 92B, so that at higher output and vehicle speeds, the second motor/generator will return to operation as a motor, indicated by the negative segment of plotted line 100. As the second motor generator transitions from generator to motor at the mechanical point 92B, the first motor/generator will transition from motor to generator as the torque applied to it or by it is reversed.

Similarly, the motor/generator 48 transitions from its operation as a motor, as plotted by line 94, to operation as a generator, as plotted by line 100.

In The Neutral Mode

There is also a neutral mode, wherein the input member 18 from the engine 12 and the two motor/generators 46 and 48 are effectively disconnected from the output drive member 70 by allowing one member of the second planetary gear subset 32 to spin freely. That is, both torque transfer devices 62 and 64 are disengaged, thus allowing the outer gear member 34 of the second planetary gear subset 32 to spin freely and thereby effect the neutral mode.

In The Reverse Mode

The forgoing transmission 10 can provide a reverse mode of operation simply by engaging the first torque transfer device 62 with the second torque transfer device 64 disengaged and by concurrently reversing the rotational direction of the rotor 68 of the second motor/generator 48, as shown by that portion of the plotted line 94 to the left of the ordinate in FIG. 2. If the engine runs at the same constant speed as for the forward modes in the example, as shown by the plotted line 88 in FIG. 2, then the first motor/generator 46 must run at an increased speed, as shown by that portion of the plotted line 90 to the left of the ordinate in FIG. 2, to compensate for the reverse rotation of the ring gear 22 in the planetary gear set 20.

As is well known in the electrical arts, a reversal of rotation of certain electric motors can be readily effected electrically by a change in polarity of the electricity supplied to it. For a direct current motor, the direction of rotation may be reversed by reversing the direct current polarity of the electric current to the field windings or to the commutator, but not to both. For a polyphase induction motor or a permanent magnet motor using alternating current, the direction of rotation may be changed by reversing the rotation of the electrical field vector in the stator, which may be accomplished by a complete reversal in the polarity of the alternating current fed to all phases.

Hence, if the vehicle operator selects reverse operation, the torque transfer device 62 is engaged to ground the outer ring gear 34 of the second planetary gear subset 32 to the housing 54. In further response to operator demand, the ECU 84 reverses the polarity of the electrical power being fed to the stator 66 of the second motor/generator 48. The resultant rotation of the rotor 68 in motor/generator 48 then reverses from the rotational direction that had been associated with forward propulsion in the first, or input split, mode of operation. Under these conditions the inner, sun gear 36 of the second planetary gear subset 32 drives the carrier 40 in planetary subset 32 against the grounded outer, ring gear 34 to effect retro-rotation of the carrier 40 and the output drive member 70 relative to the rotation of those members during forward propulsion. Operation in the reverse mode is thus achieved with the first described transmission 10 embodying the concepts of the present invention.

DESCRIPTION OF ANOTHER EXEMPLARY EMBODIMENT

Figure 3:
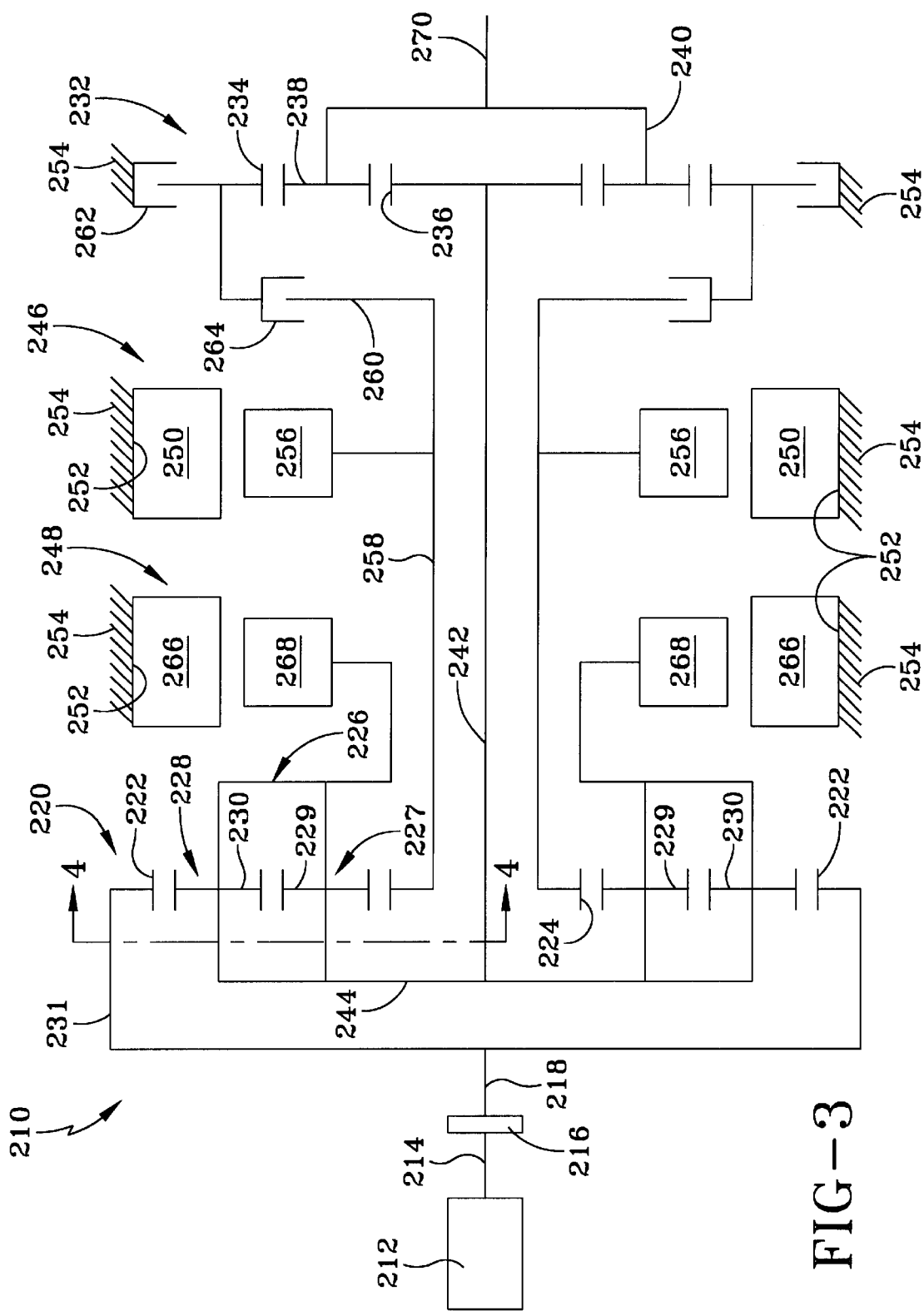
FIG. 3 is a schematic representation of another preferred form of an electrically variable transmission embodying the concepts of the present invention; and, FIG. 4 is an enlarged end view of a portion of the compound planetary gear subset incorporated in the second preferred embodiment which view has been taken substantially along line 4—4 of FIG. 3.
Figure 4:
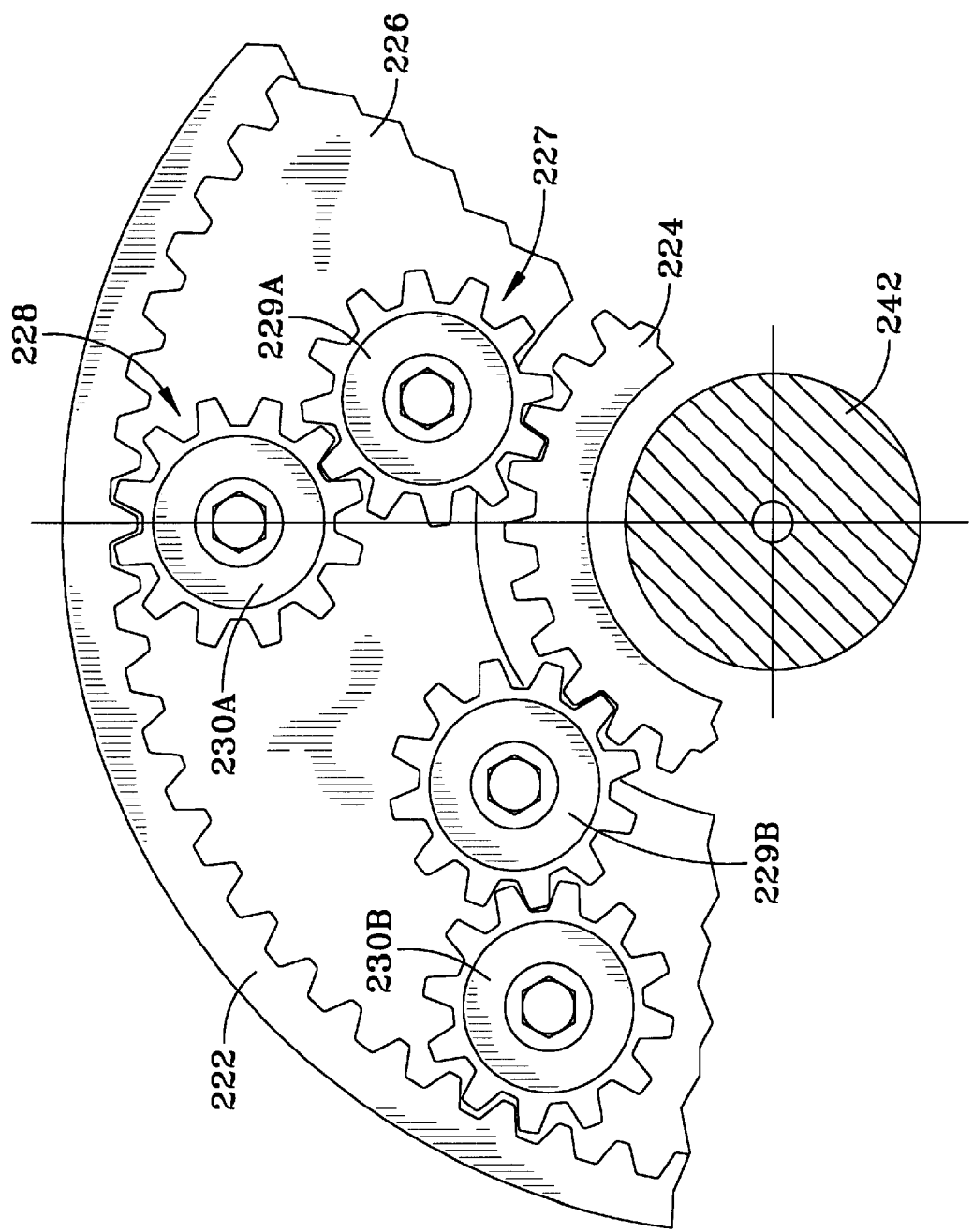

With particular reference to FIGS. 3 and 4, another preferred embodiment of the improved electrically variable transmission is identified generally by the designation 210, and that transmission may also, in part, receive its input power from an engine 212. In the embodiment depicted the engine 212 may also be a fossil fuel engine, such as a diesel engine which is readily adapted to provide its available power output typically delivered at a constant number of revolutions per minute (RPM). As shown, the engine 212 has an output shaft 214 that may also serve as the forward input member of a transient torque damper 216. The output member of the transient torsion damper 216 serves as the input member 218 of the transmission 210.

Irrespective of the means by which the engine 212 is connected to the transmission input member 218, the transmission input member 218 is operatively connected to a planetary gear subset 220 in the transmission 210.

The new and novel transmission 210 utilizes two planetary gear subsets. The first is a compound planetary gear subset 220 that also employs an outer gear member 222, typically designated as the ring gear. The ring gear 222 also circumscribes an inner gear member 224, typically designated as the sun gear. The carrier assembly 226, in the planetary gear set 220, however, rotatably supports two sets, 227 and 228, of planet gears 229 and 230, respectively. Each of the plurality of planet gears 229 in the radially inner set 227 simultaneously, and meshingly, engages the inner, sun gear 224. Each planet gear 229 meshingly engages one, and only one, adjacent planet gear 230 of the plurality of planet gears 230 in the radially outer set 228. Each planet gear 230 in the radially outer set 228 simultaneously, and meshingly, engages the outer, ring gear member 222. Each planet gear 230, in turn, meshingly engages one, and only one, adjacent planet gear 229 of the plurality of planet gears 229 in the first set 227.

FIG. 4 depicts only two of the plurality of planet gears in each set, but it should be understood not only that the plurality of gears 229A, 229B, etc. in the radially inner set 227 are spaced circumferentially about the inner sun gear 224, but also that the plurality of gears 230A, 230B, etc. in the radially outer set 228 are spaced circumferentially within the outer ring gear 222. As such, each circumferentially successive inner planet gear 229 engages only one outer planet gear 230. However, the circumferentially successive inner planet gears 229 do not engage each other or any other planet gear but one outer planet gear 230. Likewise, circumferentially successive outer planet gears 230 do not engage each other or any other planet gear but one inner planet gear 229.

The input member 218 presents a bell portion 231 that is secured to the outer ring gear 222 of the compound planetary gear subset 220.

The second planetary gear subset 232 is a simple planetary gear set, and it has an outer gear member 234, often also designated as the ring gear, that circumscribes an inner gear member 236, also often designated as the sun gear. As is typical in a simple planetary gear subset, a plurality of planet gears 238 are also rotatably mounted in a carrier 240 such that each planet gear member 238 simultaneously, and meshingly, engages both the outer, ring gear member 234 and the inner, sun gear member 236 of the second planetary gear subset 232, but the pinion gear members 238 do not engage each other.

In addition, the first and second planetary gear subsets 220 and 332 are mutually compounded in that the inner, sun gear 236 of the second planetary gear subset 232 is conjoined, as through a central shaft 242, to the carrier assembly 226 of the compound planetary gear subset 220. That is, the forward end of the central shaft 242 terminates in a radially extending flange portion 244 that is secured to the carrier assembly 226 of the compound planetary gear subset 220.

The second preferred embodiment 210 also incorporates first and second motor/generators 246 and 248, respectively. The stator 250 of a first motor/generator 246 is secured to the generally annular, interior surface 252 of the transmission housing 254. The rotor 256 of the first motor/generator 246 is secured to a sleeve shaft 258. The inner, sun gear 224 of the first planetary gear subset 220 is secured to the forward end of the sleeve shaft 258, and the opposite end of the sleeve shaft 258 terminates in a radially extending flange plate 260.

The ring gear 234 of the second planetary gear subset 232 may be selectively grounded to the housing 254, as by a first torque transfer device 262. That is, the grounded ring gear 234 is selectively secured against rotation by an operative connection to the non-rotatable housing 254. The ring gear 234 of the second planetary gear subset 232 is also selectively connected to the radially extending flange plate 260, as by a second torque transfer device 264. The first and second torque transfer devices 262 and 264 are employed to assist in the selection of the operational modes of the hybrid transmission 210, as will be hereinafter more fully explained.

The stator 266 of the second motor/generator 248 is also secured to the generally annular, interior surface 252 of the transmission housing 254. The rotor 268 of the second motor/generator 248 is secured to the carrier assembly 226 of the compound planetary gear subset 220, and as such the first and second planetary gear subsets 220 and 232 are further mutually compounded.

The two planetary gear subsets 220 and 232 as well as the two motor/generators 246 and 248 may be coaxially oriented, as about the axially disposed central shaft 242. This configuration assures that the overall envelope—i.e.: the circumferential dimension—of the transmission 210 may be minimized.

The output drive member 270 of the transmission 210 is secured to the carrier 240 of the second planetary gear subset 232.

Operation of the Second Described Embodiment
In The Input Split Mode

To effect the input split mode of operation for transmission 210 the torque transfer device 262 is engaged to ground the outer, ring gear 234 of the planetary gear subset 232 to the housing 254 of the transmission 210. The transmission 210 uses the outer, ring gear 222 of the compound planetary gear subset 220 to receive power from the input member 218. The inner, sun gear 224 of the compound planetary gear subset 220 is operatively connected to the rotor 256 of motor/generator 246 through sleeve shaft 258. The carrier assembly 226 not only receives the torque delivered by the rotor 268 of motor/generator 248 but also simultaneously delivers, through radially extending flange portion 244, the output (of the combined inputs) to a central shaft 242 that is connected to the inner sun gear 236 of planetary gear subset 232.

Rotation of the inner sun gear 236 drives the planet gears 238 against the grounded ring gear 234 to drive the carrier 240 of planetary gear subset 232 in a direction appropriate to forward propulsion of the vehicle by transmission 210 in the split input mode.

In The Compound Split Mode

To change from the input split mode to the compound split mode the first torque transfer device 262 is disengaged and the second torque transfer device 264 is engaged. In that configuration the outer ring gear 234 of planetary gear subset 232 is operatively connected, through radial flange plate 260, to the sleeve shaft 258 and thus to the inner sun gear 224 of the compound planetary gear subset 220 as well as the rotor 256 of motor/generator 246. In the compound split mode the transmission uses the same two planetary gear subsets 220 and 232 to provide the maximum output for propelling the vehicle through the output drive member 70.

The Neutral and Reverse Modes

In the second preferred embodiment there are two ways to achieve neutral as well as reverse operation. As in the first preferred embodiment neutral operation may be achieved by releasing both torque transfer devices 262 and 264. Likewise, reverse operation may be achieved by engaging the first torque transfer device 262 and disengaging the second torque transfer device 264. The first motor/generator 246 runs at high speed to allow the central shaft 242 to reverse, if the engine 212 is running, and the second motor/generator 248 may be reversed by electrical means.

The second preferred embodiment of the present invention, as represented by transmission 210, may also utilize a geared neutral which is transformed into a reverse mode by controlling the variable speed of the sun gear 224.

To arrive at a geared neutral one can start with the vehicle being propelled forwardly at its maximum speed. That is, the first torque transfer device 262 is disengaged, and the second torque transfer device 264 is engaged. In that situation the outer, ring gear 222 of the compound planetary gear subset 220 rotates at a fixed speed inasmuch as ring gear 222 rotates in unison with the engine 212—through output shaft 214, the transient torque damper 216 and the input shaft 218.

On the other hand, the inner, sun gear 224 rotates at the same speed as the rotor 256 of motor/generator 246, and the speed of the rotor 256 is variable. With the motor/generator 246 operating as a motor, and at its slowest speed, the carrier assembly 226 rotates to propel the vehicle forwardly at its maximum forward speed under the influence of the motor/generator 246.

As the operator demands slower speed of the vehicle, the rotational speed of the rotor 256 in motor/generator 246 is increased. The more the rotational speed of the rotor 256 is increased the slower the carrier 240 of planetary gear subset 232 rotates, thus slowing the vehicle. With a continuing increase in the speed of rotor 256 and a corresponding increase in the speed of the inner, sun gear 236 the output speed of the carrier 240 and the output shaft 270 progressively decreases until the forward speed of the vehicle reaches zero. The is designated as a geared neutral.

A continuing increase in the rotational speed of the rotor 256, and thus also the rotational speed of the inner sun gear 236, effects a reversal in the rotational direction of the carrier 226 in compound planetary gear subset 220. That directional reversal of carrier 226 is fed through the central shaft 242 to drive the sun gear 236 of planetary gear subset 232 in the opposite direction, thereby driving the vehicle in reverse.

SUMMATION

The foregoing invention provides continuously variable ratio of input speed to output speed such that it can be effectively utilized as an automotive transmission as well as a public transportation vehicle that is subjected to a wide variety of operating requirements. The engine speed can remain constant or vary independently of the vehicle speed for fuel conservation and to reduce the emissions of pollutants and carbon dioxide Shift to the selected mode of operation can be synchronous without wasted energy, so that the shifts can be instantaneous, imperceptible and without wear to the transmission components.

CONCLUSION

While only two preferred embodiments of the present invention is disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

As should now be apparent, the present invention utilizes only two planetary gear subsets and only two clutches in the nature of torque transfer devices as well as fulfilling the remaining aspects of the invention.

What is claimed is:

1. An electrically variable transmission comprising an input member to receive power from an engine;

an output member;

first and second motor/generators;

first and second differentially geared subsets;

said differentially geared subsets each having an inner gear member and an outer gear member, each of which meshingly engage a plurality of gear members rotatably mounted on a carrier;

said input member being operatively connected to either said outer gear member or said carrier of said first differentially geared subset;

said output member being operatively connected to said carrier in said second differentially geared subset;

one motor/generator operadvely connected to said inner gear member in said first differentially geared subset;

the other motor/generator being in continuous, operative connection with said inner gear member of said second differentially geared subset and with either said outer gear member or the carrier of said first differentially geared subset, whichever member is not connected to said input member;

a first torque transfer device selectively grounding said outer gear member of said second differentially geared subset;

a second torque transfer device selectively connecting said outer gear member of said second differentially geared subset to said inner gear member of said first differentially geared subset; and a neutral mode is effected by disengagement of both said first and second torque transfer devices.

2. An electrically variable transmission, as set forth in claim 1, wherein:

an input split mode is effected by engagement of said first torque transfer device while maintaining said second torque transfer device disengaged.

3. An electrically variable transmission, as set forth in claim 1, wherein:

a compound split mode is effected by engagement of said second torque transfer device and disengagement of said first torques transfer device.

4. An electrically variable transmission, as set forth in claim 1, wherein:

said input member is operatively connected to said carrier of said first differentially geared subset; and, said motor/generator connected to said inner member of said second differentially geared subset is also operatively connected to said outer ring gear of said first differentially geared subset.

5. An electrically variable transmission, as set forth in claim 1, further comprising:

energy storage means for accepting power from, and supplying power to, said first and second motor/generators; and, control means for regulating power flow between said energy storage means and said motor/generators as well as between said first and second motor/generators.

6. An electrically variable transmission, as set forth in claim 5, further comprising:

a reverse mode may be effected by said control means reversing the magnetic polarity of said motor/generator connected to said inner sun gear of said second differentially geared subset.

7. An electrically variable transmission, as set forth in claim 1, wherein:

said differentially geared subsets are planetary gear subsets.

8. An electrically variable transmission, as set forth in claim 7, wherein:

said planetary gear subsets each having an inner sun gear member and an outer ring gear member, each of which meshingly engage a plurality of planet gear members rotatably mounted on said carrier.

9. An electrically variable transmission, as set forth in claim 8, wherein:

said input member is operatively connected to said outer ring gear of said first planetary gear subset; and, said first planetary gear subset is compounded in that more than one set of planet gears are mounted on said carrier in said first planetary gear subset.

10. An electrically variable transmission, as set forth in claim 9, wherein:

said motor/generator connected to said inner sun gear of said second planetary gear subset is also connected to said carrier assembly of said first planetary gear subset.

11. An electrically variable transmission, as set forth in claim 10, wherein said carrier in said compounded planetary gear subset further comprises:

a radially inner and a radially outer set of pinion gears;

said radially inner set of pinion gears meshingly engaging said inner, sun gear;

said radially outer set of pinion gears meshingly engaging said outer, rim gear;

each of said plurality of pinion gears in said radially inner set meshingly engaging only one adjacent pinion gear in said radially outer set.

12. An electrically variable transmission, as set forth in claim 11, wherein:

an input split mode is effected by engagement of said first torque transfer device while maintaining said second torque transfer device disengaged.

13. An electrically variable transmission, as set forth in claim 12, wherein:

a compound split mode is effected by engagement of said second torque transfer device and disengagement of said first torque transfer device.

14. An electrically variable transmission, as set forth in claim 13, wherein:

a neutral mode may be effected by disengagement of both said first and second torque transfer devices.

15. An electrically variable transmission, as set forth in claim 13, further comprising:

energy storage means for accepting power from, and supplying power to, said first and second motor/generators;

control means for regulating power flow between said energy storage means and said motor/generators as well as between said first and second motor/generators; and, a reverse mode may be effected by said control means reversing the magnetic polarity of said motor/generator connected to said inner sun gear of said second differentially geared subset.

16. An electrically variable transmission, as set forth in claim 13, wherein neutral and reverse modes of operation may be effected by:

engaging said second torque transfer device with said first torque transfer device remaining disengaged;

maintaining said outer ring gear of said compound planetary gear subset at a constant rotational speed; and, progressively increasing the rotational speed of said inner, sun gear of said planetary gear subset sequentially to reach the neutral and reverse modes of operation as the rotational speed of said inner, sun gear in said compound planetary gear subset progressively increases.

* * * * *